(12) United States Patent
Dubois et al.

(10) Patent No.: US 10,744,448 B2
(45) Date of Patent: Aug. 18, 2020

(54) GAS SEPARATION UNIT COMPRISING A ROTOR WITH A PLURALITY OF SECTORS AND A STATOR

(71) Applicant: SOLVAY SA, Brussels (BE)

(72) Inventors: Eric Pierre Dubois, Wasseiges (BE); David Jean Lucien Savary, Sérézin-du-Rhône (FR); Jean-Paul Coquerel, Saint-Clément (FR)

(73) Assignee: SOLVAY SA, Brussels (BE)

( * ) Notice: Subject to any disclaimer, the term of this patent is extended or adjusted under 35 U.S.C. 154(b) by 220 days.

(21) Appl. No.: 15/741,313

(22) PCT Filed: Jul. 1, 2016

(86) PCT No.: PCT/EP2016/065617
§ 371 (c)(1),
(2) Date: Jan. 2, 2018

(87) PCT Pub. No.: WO2017/001691
PCT Pub. Date: Jan. 5, 2017

(65) Prior Publication Data
US 2018/0193792 A1    Jul. 12, 2018

(30) Foreign Application Priority Data

Jul. 2, 2015 (EP) .................................... 15306073
Oct. 27, 2015 (EP) .................................... 15306713

(51) Int. Cl.
*B01D 53/06* (2006.01)
*B01D 53/04* (2006.01)

(52) U.S. Cl.
CPC ..... *B01D 53/0446* (2013.01); *B01D 53/0407* (2013.01); *B01D 53/0462* (2013.01);
(Continued)

(58) Field of Classification Search
CPC ............ B01D 53/0446; B01D 53/0407; B01D 53/0462; B01D 53/06; B01D 2257/504; B01D 2259/40005; Y02C 10/08
(Continued)

(56) References Cited

U.S. PATENT DOCUMENTS 4,612,022 A * 9/1986 Berry .................... B01D 53/06
95/113
4,764,276 A    8/1988 Berry et al.
(Continued)

FOREIGN PATENT DOCUMENTS

EP    1145755 A1    10/2001

*Primary Examiner* — Minh Chau T Pham

(57) ABSTRACT

Gas separation unit for separation of a gas component from a process gas stream, said separation unit comprising a stator and a rotor comprising a plurality of sectors, each sector containing a separation device arranged to separate the gas component from the process gas stream which is led into the separation device and each sector being fluidically connected with at least one valve. The valve is a rotary active valve which comprises a rotor open area which is located at the rotor and a stator open area which is located at the stator. The rotor open area and the stator open area can overlap and can be laterally separated from each other by rotation of the rotor relative to the stator. In this way, the valve can at least partially be opened and closed. The extent of overlap of the rotor open area and the stator open area defines the extent of opening and closing of the valve, respectively. The extent of overlap corresponds to the extent of partial opening of the valve.

19 Claims, 11 Drawing Sheets

Figure 1A:
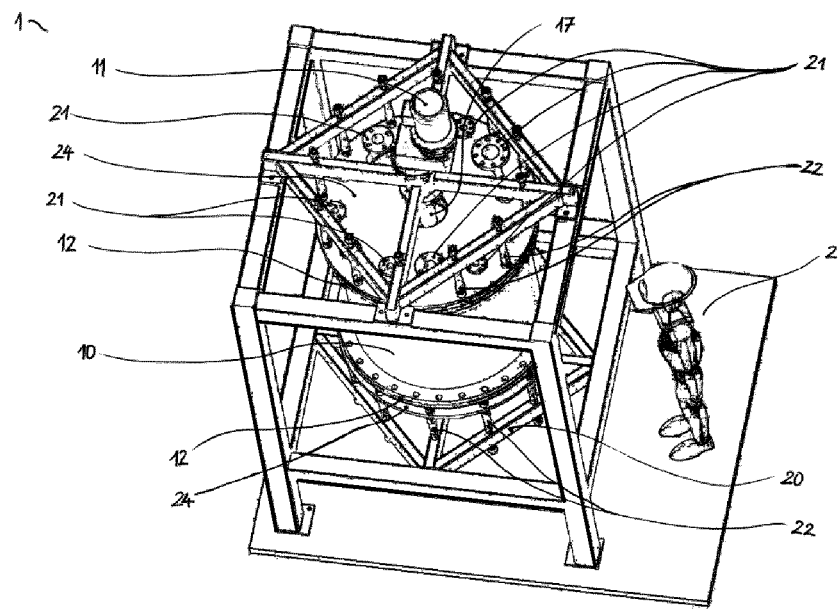

(52) U.S. Cl.
CPC ........ *B01D 53/06* (2013.01); *B01D 2257/504* (2013.01); *B01D 2259/40005* (2013.01); *Y02C 10/08* (2013.01)

(58) Field of Classification Search
USPC ....... 95/113, 96; 96/139, 125, 115, 108, 121
See application file for complete search history.

(56) References Cited

U.S. PATENT DOCUMENTS

| | | | |
|---|---|---|---|
| 2001/0009124 A1* | 7/2001 | Suzuki | B01D 53/06 95/113 |
| 2005/0183572 A1* | 8/2005 | Keefer | B01D 53/0446 95/96 |
| 2013/0319235 A1 | 12/2013 | Wolf et al. | |
| 2013/0333571 A1* | 12/2013 | Sundaram | B01D 53/0446 96/115 |
| 2014/0199228 A1* | 7/2014 | Kniesburges | B01D 53/1475 423/427 |
| 2018/0169567 A1* | 6/2018 | Vandervorst | B01D 53/0462 |

\* cited by examiner

GAS SEPARATION UNIT COMPRISING A ROTOR WITH A PLURALITY OF SECTORS AND A STATOR

This application is a U.S. national phase entry under 35 U.S.C. § 371 of International Application No. PCT/EP2016/065617, filed on Jul. 1, 2016, which claims priority to European Application Nos. 15306073.6, filed on Jul. 2, 2015 and 15306713.7, filed on Oct. 27, 2015. The entire contents of these applications are explicitly incorporated herein by this reference.

The present invention concerns a large scale gas separation unit for separation of a gas component from a process gas stream, wherein the separation unit comprises a stator and a rotor which is connected to the stator and is rotatable relatively to the stator about a rotational axis, the rotor comprising a plurality of sectors, each sector containing a separation device arranged to separate the gas component from the gas component stream which is led into the separation device, wherein each sector is fluidically connected with at least one valve.

It is known in the art to use rotating units for separation of gas from a process gas stream, particularly for separation of carbon dioxide ($CO_2$). One method uses centrifugal forces in order to move a liquid in counter current flow to a process gas which is forced to the rotation center by gas pressure. In this way, a process gas component which is to be separated can be absorbed in the liquid. Carbon dioxide, for example, can be absorbed from air in monoethanol amine, as is disclosed in US 2013/0319235 A1.

Using a rotor with sectors which are rotating with the rotor for gas separation is known from European patent application EP 1 145 755 A1. In the sectors, the separation process takes place, wherein the rotor rotates the sections to different stations where different steps of the process are carried out. The solution according to EP 1 145 755 A1 has the disadvantage that when changing from flowing the process gas through a sector to flowing a stripping gas through the sector, a rest of the process gas remains in the conduits to the separation devices in the sectors and dilutes the stripping gas such that the concentration of the separated gas in the stripping gas is deteriorated.

An objective of this invention is to provide a large scale gas separation unit enabling a high concentration of the separated gas.

The solution of this objective is achieved by the gas separation unit described herein, which comprises notably a rotary active valve (40). The valve comprises a rotor open area which is located at a rotor and a stator open area which is located at a stator. The rotor open area and the stator open area can overlap and can be laterally separated from each other by rotation of the rotor relative to the stator. In this way, the valve can at least partially be opened and closed. The extent of overlap of the rotor open area and the stator open area defines the extent of opening and closing of the valve, respectively. The extent of overlap corresponds to the extent of partial opening of the valve.

An open area means a possibility for a gas to penetrate through a valve region in which the open area is located. The valve region of the rotor also comprises rotor solid areas which cannot be penetrated by gas in a significant extent. Because the valve region comprises open areas without a physical presence, the valve region can be, at least partially, a theoretical plane or surface. The physical part or member to which the valve region belongs, preferably comprises a through a hole with the form of the open area.

An advantage of this solution is a significantly reduced dead zone in which process gas remains when another type of gas is led through a sector with the valve according to the invention, or when the flow direction is reversed. This is because the open areas of the valve can be arranged closer to the separation device as an external valve could be. In this way, an improved concentration of the separated gas can be achieved. For example, the concentration of $CO_2$ in a process gas of 3% to 45% can be enhanced to 30% to 100% in the gas that is extracted from the gas separation unit.

As a further advantage, a progressive opening and closing of the valves is possible, which avoids quick pressure changes. Preferably, the gas separation unit is operated at a pressure that is lower or higher than the pressure of the surrounding atmosphere, for example at about 800 hPa to about 2500 hPa abs in a normal atmosphere of about 1000 hPa abs. It is preferred that the valve is adapted to seal the gas in the gas separation unit against the surrounding atmosphere. Process temperatures can, for instance, range from 20° C. to 150° C. in a $CO_2$ separation process. The valve and particularly its sealings can be arranged to withstand these temperatures.

The open areas of the active rotary valve preferably act together with open areas of other active rotary valves of the gas separation unit, for example valves belonging to different sectors. Therefore, an active rotary valve is considered as according to the invention even if it's open areas act together only during a small period of operation time only or if two valve open areas are not clearly assignable to one specific valve but to a set of valves only.

The separation device of a sector can use sorption, preferably adsorption and/or a temperature swing in order to separate a gas, particularly carbon dioxide, from the process gas. To this end, the process gas with the gas component which is to be separated can be led into or through the separation device in a first step, wherein the gas component is bound and/or separated, and in a second step, the separated gas can be released from or and/or led out of the separation device. For the first and the second step, the same path through the sector can be taken by the process gas and by the separated gas component, wherein the flow direction can, in view of the first step, be reversed in the second step. In the at least two processing steps, the sectors can fluidically be connected to different gas streams.

The rotational axis is to be considered as theoretical axis which can, but needs not to have a physical correspondent. The sectors can have at least approximately the shape of a segment of a circle, but need not necessarily to have such a shape. Preferably, the rotor open area of the valve is arranged at an outer surface of the rotor. Also, preferably no significant use of centrifugal forces is made. The separation unit is preferably used in large-scale applications which means that gas is separated in an amount that is much greater than the amount of a typical laboratory scale where gas separation may be used for analytical or experimental purposes. Laboratory separation yield is typically in the range of 0.0001 k tons per year. For example, the yield of a large scale application can be about 20 k tons to 150 k tons of carbon dioxide per year which is extracted from the gas separation unit in an exit stream. This is an advantageous size for using the gas separation unit for carbon dioxide separation in order to supply a typical sodium bicarbonate production process. Gas separation units preferably have a yield of about at least 0.5 k tons of $CO_2$ per year. From this size on and in larger sizes, they operate economically in typical embodiments and under standard economic conditions. Advantageously, larger gas separation units significantly enhance the economy of the gas separation unit. Gas separation units having a yield of 500 k tons of $CO_2$ per year are possible and operate with improved economy.

In an embodiment, a rotor open area is located in a flat valve region of the rotor or of a member of the rotor, and a stator open area is located in a flat valve region of the stator or a of a member of the stator. Preferably, the valve regions are both arranged perpendicular to the rotational axis. Then, no tilt compensation is required when the rotor is rotating.

The flat valve regions of the rotor and the stator can touch each other in a tight way such that a good tightness can be achieved even if there is a relative movement between the two flat valve regions. Furthermore, flat valve regions are comparably easy to manufacture. Flat means that the surface is not significantly bent.

It is possible to locate one or each of the open areas in separable members of the rotor and the stator, respectively. The rotor open area and/or the stator open area can be arranged in an axial plane of a plate, disc or ring of the rotor and the stator, respectively. The plate, disc or ring can additionally comprise further geometries deviating from a plate, the disc or a ring form and/or it can be separable or attached to the rotor and the stator, respectively, for example by screwing or welding. A rotor plate, disc or ring can be attached at an axial end of the rotor. Preferably, if a plurality of open areas and valves are present, at least two windows in the rotor plate, disc or ring are arranged at the same radius in regard of the rotational axis. Corresponding open areas in the stator plate, disc or ring are preferably arranged at the same radius in regard of the rotational axis. The pattern of the rotor open areas is preferably similar or identical to the pattern of the stator open areas, preferably in a tangential direction in regard of the rotational axis. Then, a regular opening and closing of valves is possible. Alternatively, the rotor solid areas can have the same pattern as the stator open areas, preferably in a tangential direction in regard of the rotational axis. Then also, a regular opening and closing of valves is possible.

The window plates, discs or rings are, for example, made of hardened steel, ceramics or another stiff, hard and/or wear resistant material. Preferably, they have a flatness which leads to a sufficient tightness. A contact surface for mechanical contact between the rotor and the stator can be coated with a material which improves tightness and/or wear and/or friction. This can be a material with a soft component and a hard component in order to have stability and flexibility at the same time. The hard component can, for example, comprise fibers. As the valve regions in the rotor and the stator move relative to each other in operation, the coating can also contain a friction reduction material and/or agent, which also can ameliorate wear.

The plates, discs or rings can hold the sectors such that they can also have the function of a mechanical connection element. This is also true for rings of the embodiment which is described next.

In a further embodiment, a rotor open area is located in a valve region on the outer periphery of the rotor or of a peripheral member of the rotor, wherein the valve region has a convex shape having a constant radius in regard of the rotational axis. A stator open area has complementary shape and is located in a valve region on a surface of the stator or of a member of the stator. In a mounted state, the valve region of the stator is directed to the valve region of the rotor and has the same constant radius in regard of the rotational axis as the valve region of the rotor. Preferably, the valve regions are arranged at a cylindrical outer surface of the rotor and the stator, respectively. A valve region member or section of the rotor and/or the stator can be ring shaped, wherein the valve regions are arranged in the peripheral surface of the ring. The ring preferably has a greater axial dimension than its radial thickness. An outer surface of such a ring can, in case of the stator valve region, also be a concave surface. The ring can be separable and/or attached to the rotor and the stator, respectively, for example by welding or screwing. The rotor open area and the stator open area are, in their mounted positions, preferably arranged at the same axial position in regard of the rotational axis. If there is a plurality of open areas and valves present, the rotor open areas and the stator open areas can have a similar pattern in the rotor and the stator, preferably in a tangential direction in regard of the rotational axis.

In order to match radii of the rotor valve region and the stator valve region and to compensate for shape irregularities and deviations from a cylindrical form, elastic components of the stator and the rotor or of a separable sealing can be involved. As mentioned with more details in regard of the previously described embodiment, on at least one of the rotor and the stator valve regions a coating can be arranged which can ameliorate tightness and/or wear. Also, a ring as mentioned above can have a dedicated elasticity for form and/or diameter compensation.

In a further embodiment, a rotor solid area is a surface located at or close to a boundary wall of a sector. An open inner part of the sector acts as the rotor open area, for instance, the open in a part of the sector can be a volume that is fluidically connected to the inlet to one or more gas separation devices. Preferably, the rotor solid area is formed by a surface of a wall which separates two neighbored sectors.

Preferably, the rotor solid area is formed by an axial end surface of a sector boundary wall, also commonly referred to by the skilled person as sector division wall or sector dividing wall or separator wall. Such are rotor solid area is preferably combined with a flat plate or disc formed stator valve region.

In an alternative preferred example, the rotor solid area is formed by radial surface of a sector boundary wall. Such a rotor solid area is preferably combined with a ring shaped stator valve region that extends in direction of the rotational axis and that has, perpendicularly thereto, a constant radius with regard of the rotational axis.

Preferably, the width of the surface of a sector boundary wall is greater than the width of the stator open area, in rotational direction, preferably less than half the width of sector boundary wall greater. Then, the time period, during which the valve is closed, is short and mainly only during the transit of a sector boundary wall in front of the stator open area. Therefore, gas transfer through the valve and to the gas separation device is possible during a significant portion of the operation time of the unit, in many cases.

Preferably, the boundary wall surface has a substantially straight form. For example, the boundary wall is arranged in radial direction in regard of the rotational axis.

In a further embodiment, the rotor open area and the stator open area both have the form of a window. The rotor solid area has the form of an outer surface of the rotor, and is arranged between two windows. A window shall be understood as an open area with a size which is small in comparison to a cross-section perpendicular to the rotational axis.

In a further embodiment, a sealing is arranged between the valve regions of the rotor and the stator. The sealing is attached to one of the stator and the rotor. It is also possible to attach a sealing component to each of the stator and rotor such that the relative movement takes place between the sealings. The sealing has open areas which have the same pattern of open areas as the component to which the sealing is attached. Thus, the sealing openings matches with the pattern of the stator open areas (23) when the sealing is fixed to the stator (20), or the pattern of the sealing openings matches with the pattern of the rotor open areas (14) when the sealing is fixed to the rotor (10), wherein the sealing is preferably fixed to the stator (20). In this way, it is rendered possible that gas can flow through the open areas of the rotor and the stator when they are overlapping. The form of the sealing can match with the form of the open areas which can be window areas, i.e., the sealing can for instance have plate shape, disc shape, flat ring shape or ring shape with comparably significant axial extension.

Preferably, the sealing is elastic in order to compensate irregularities of or form deviations between the surfaces in which the open areas are located. The rotor valve region and the stator valve region can in operation be pressed against the sealing in order to improve tightness.

The sealing is preferably fixed to the stator, and there is no sealing at the rotor. This has the effect that the dead zone which contributes to dilution of the gas to be separated is reduced as the location of valve action is arranged at the outer surface of the rotor. Therefore, the volume of the sealing window is not a part of the dead zone, but it would be if the sealing was attached to the rotor. This advantageous effect can also be achieved, if the sealing comprises two components, one of which is arranged on the stator and a counterpart is arranged on the rotor, as the sealing on the rotor can be thinner as it would be if there was a sealing on the rotor only.

In a preferred embodiment with two sealing components, wherein one of the sealing components is to be arranged on the rotor and other one on the stator, respectively, one of the components is softer than the other one which is called a hard component in the following.

Typically, the softer component has a hardness which is lower than the hardness of the hard component; the hardness can be notably Shore D or Rockwell C hardness.

The hard component has preferably a Rockwell C hardness (HRC), as defined by ASTM E18, of at least 45, more preferably of at least 50, even more preferably of at least 55. Besides, the hard component has preferably a HRC of at most 70, more preferably of at most 67 and even more preferably of at most 65.

Preferably, the softer component has a Shore D hardness, as defined by ASTM D2240, of at least 40, more preferably of at least 50, even more preferably of at least 60.

In some embodiments, it is preferred to arrange the softer component at the rotor; this is because the rotor valve region comprises more open areas than the stator valve region, such that the covered area is smaller as on the stator. Nevertheless, it is much more often preferred to arrange the soft sealing component on the stator; indeed, the soft component is more probable to wear and thus to be replaced first, and, when arranged at the stator, access thereto is easier. The use of a hard and soft sealing component has the advantage that the soft component adapts to the form of the hard component such that form precision of the valve regions can be lower. Moreover, the use of a hard and soft sealing improves the operational life time of the surfaces in contact. Indeed, the soft component is able to absorb small particles that may be present during the operation, thus limiting friction and wear while maintaining a proper sealing. The sealing hard component is preferably smooth to avoid abrasive effects and fast wear out of the soft sealing component. The sealing hard component can be polished. Preferably, surface roughness $R_a$ of the hard component is 1 µm or less. The surface roughness of the soft component can be expected to adapt to the surface roughness of the hard component by wear. It is preferred, that edges from a valve region to open areas in it have a radius such that the sealing can cross these edges without significant wear. Because the soft component is softer, its surface profile is expected to be flattened by a sealing pre-load, i.e., the force by which the rotor and the stator are pressed against each other. The surface roughness of the soft component can thus be greater than the surface roughness of the hard component. The pre-load is preferably adapted to provide low friction, low wear and a good sealing effect.

In a further embodiment, suitable soft materials can be polymers which are preferably fiber enforced. For example, polyetheretherketone (PEEK) or polytetrafluorethylene (PTFE) can be used. These materials can be fiber reinforced, particularly by glass fibers or carbon fibers. Alternatively, PEEK or PTFE can be added to a conventional fiber glass or carbon fiber reinforced material which might comprise epoxy or polyester resin, respectively. PEEK of PTFE or both can be added as particles or layers, for instance. The basic material, including fibers or not, can additionally contain graphite, $MoS_2$ and/or $WS_2$, as a friction reduction agent. Also, a self-lubricating sealing can be used, for example a sealing of solid graphite or a sealing with a graphite layer at its friction surface. Preferably, on the stator, a dedicated sealing counterpart is attached. This can for example be a coating or a layer which comprises chromium oxide ceramic, tungsten carbide or silicon carbide which are very hard materials. Alternatively, the stator can form a sealing counterpart by its basic material in the valve region, for example a hardened steel. Hardening can for example be performed by nitriding, particularly plasma nitriding, or carburizing. The steel is preferably stainless steel. All combinations of the above-mentioned materials for the sealing components provide preferable tribological systems which are suited to withstand chemical attacks, for example by acids, and thermal shocks, for example of about 100° C. This results in low friction and long lifetime, for example of more than 1 year of continuous operation, preferably of about 4 years.

A preferred combination is PTFE reinforced fiber glass with stainless steel hardened by ionic nitriding. Alternatively, PTFE reinforced fiber glass can be combined with chromium oxide and ceramic which can be deposited as a coating. As another alternative, PTFE reinforced fiber glass which is also comprises $MoS_2$ can be combined with and tungsten carbide coating, preferably on stainless steel.

In a further embodiment, the rotor open area is arranged close to or at an inlet into the gas separation device in a sector of the rotor. In this way, the dead zone is reduced as any intermediate volume between the rotor window and the inlet of the gas separation device to contribute to dead zone volume in which gas separation is not present or is minimized. If there is a plurality of the single effective gas separation devices in a sector, it is preferred that their inlets are arranged close to or at the rotor open area. Alternatively, a gas distributor with a small gas containing volume can be arranged between the rotor open area and the inlets of the gas separation device switch which also shall be considered as a close arrangement of the rotor open area and the inlets to the gas separation devices.

In a further embodiment, a gas distributor is arranged close to a rotor open area of a sector. Then, the gas separation device(s) can themselves be arranged close to the rotor open area which avoids unnecessary dead zone volume. Preferably, the gas distributor is arranged in a plate, disc or ring in which the rotor open area of the sector is arranged. The gas distributor can have the form of a diffusor which has an increasing cross-section with its distance to the valve region. In many cases, at a greater cross-section, more inlets of gas separation devices can be arranged.

In a further embodiment, one of the rotor open area and the stator open area has a smaller extent in rotational direction than the other open area. A relative movement of the rotor and the stator in rotational direction leads to an opening and closing characteristic in which with start of overlap of the rotor open area and the stator open area, a continuous increase of a gas stream occurs. After the smaller open area is fully overlapped by a part of the bigger open area, preferably a phase follows in which the smaller window is continuously fully overlapped by a part of the bigger window and during which the small open area moves through the cross-section of the bigger open area. Therefore, the throughput of gas is kept constant in this phase. After this phase, a closing phase follows. In the closing phase, the overlap between the two open areas is continuously reduced such that a continuous decrease of the gas flow occurs during the further relative movements of the rotor and the stator.

Preferably, the stator open area has the smaller extent in rotational direction, and preferably has a window shape as defined above. Then, the bigger rotor open area can serve as a part of a distributor or a diffusor for a plurality of gas separation devices in a sector. However, in an alternative example, it is preferred to have the smaller rotor open area, especially, if there is a dedicated low dead zone distributor or diffusor arranged at the rotor open area which has a smaller dead zone volume as a big rotor open area construction would have.

Sectors may have a dead zone or may be free of dead zone. Dead zones are typically zones where process gas can remain entrapped.

Advantageously, at least one sector is such that its dead zone, if any, does not exceed 10 vol. % of the total volume of the sector. Preferably it does not exceed 5 vol. %; more preferably it does not exceed 2 vol. %, even more preferably it does not exceed 1 vol. % of the total volume of the sector. The most preferably, at least one sector is essentially free or is even completely free of dead zone.

Preferably, each sector is such that its dead zone, if any, does not exceed 10 vol. % of the total volume of the considered sector; more preferably it does not exceed 5 vol. %; still more preferably it does not exceed 2 vol. %, the most preferably it does not exceed 1 vol. % of the total volume of the sector. The most preferably, each sector is essentially free or is even completely free of dead zone.

Besides, it has been found advantageous that at least one sector is such that its dead zone, if any, does not exceed 10 vol. % of the total volume of the gas separation device. Preferably it does not exceed 5 vol. %; more preferably it does not exceed 2 vol. %, even more preferably it does not exceed 1 vol. % of the total volume of the gas separation device.

Preferably, each sector is such that its dead zone, if any, does not exceed 10 vol. % of the total volume of the gas separation device; more preferably it does not exceed 5 vol. %; still more preferably it does not exceed 2 vol. %, the most preferably it does not exceed 1 vol. % of the total volume of the gas separation device.

In a further embodiment, between two open areas out of a rotor valve region or out of a stator valve region, a non-overlapping zone without open areas is arranged. The non-overlapping zone has an extent in rotational direction that is bigger than the greatest extent in rotational direction of an open area from the other valve region that comprises the open areas for overlapping with the open areas of the valve regions with the above-mentioned non-overlapping zone. In this way, it can be prevented that an open area acts as a bridge between two open areas of one valve region. Therefore, gas which is for example in different sectors or in different gas supplies of the stator cannot mix. One supply is connected to one sector only.

In a further embodiment, each sector comprises two valves, one at or close to each axial end of the rotor. In this way, gas can cross a gas separation device in an axial direction of the rotor. This is advantageous because no bending off the gas path is necessary to change or reverse the direction of the gas flow which is also advantageous for an efficient use of the volume of a sector. The arrangement of the open areas on the rotor and the stators as well as the form of the open areas can be identical for both axial ends of the rotor. A valve which is arranged at the periphery of the rotor and which is not arranged in the middle or near the middle of the rotor is also considered as being close to an axial end of the rotor.

Generally, a heating system and a cooling system are required for at least one sector. Thus, generally at least one of the heating fluid or cooling fluid flows through the sector using the same pathway as the process gas and the component gas. In a further embodiment, at least one sector and preferably each sector has a heating and cooling system that is independent from the process gas throughput through the sector. In another embodiment, at least one sector and preferably each sector has a heating and/or cooling system that is independent from the gas component (GC) stream that is led through the sector. In still another embodiment, at least one sector and preferably each sector has a heating and cooling system that is independent from the process gas throughput and from the gas component (GC) stream that are led through the sector (16). In still another embodiment, at least one sector and preferably each sector has a heating and/or cooling system that is independent from the process gas throughput and from the gas component (GC) stream that are led through the sector (16). As herein used, "independent" typically denotes that the heating or cooling fluid, as the case may be, flows through the sector via a circuit which is specifically used for heating or cooling purposes and which is separated from the process gas and/or the gas component throughput, as the case may be. This disposal has the advantage that neither the process gas, nor the gas component is susceptible of being contaminated by the heating fluid or by the cooling fluid or by both of them. Moreover, the use of the gas separation unit in such a configuration makes the choice of the fluids that are used for heating and cooling more flexible.

Accordingly, in some embodiments, valves which are dedicated for the heating system are provided in the same way that has been proposed for the process gas. In other embodiments, valves which are dedicated for the heating system and/or for the cooling system are provided in the same way that has been proposed for the process gas and the gas component. In still other embodiments, heating and cooling fluids flow through the sectors without mixing with the process gas and the separated gas. The open areas of valves for supplying heating and cooling gases to a sector can, for example, be arranged at a different radius in a flat axial window area in a window disc or/and at a different axial position in a peripheral window ring. The authors have found particularly advantageous to use open areas of valves for supplying at least one of the heating and cooling fluids that are arranged at a different radius in a flat axial window area in a window disc.

In a further embodiment, the gas separation unit is arranged for continuously rotating the rotor relatively to the support. The stator open areas and their supplies are stationary whereas the rotor is relatively moved to the stator such that a quasi-continuous operation of the gas separation unit can be achieved in this way. Only in the transitions of the open areas between different sectors, the flow of gas is discontinued.

In a further embodiment, each sector has the same angle portion of the rotor. The angle portion corresponds to 360° divided by the number of sectors.

Preferably, 2 to 100 sectors are arranged around the rotor. Very large numbers of sectors are particularly used for a very large size unit.

If there are more sectors than process steps, more than one sector can perform the same or a similar process step at the same time. It is preferred to have a number of sectors that corresponds to the number of process steps or a multiple thereof, wherein the multiple is calculated by multiplying with a whole-number. It is particularly preferred to have 8 to 24 sectors in the rotor. Further, the number of sectors usually corresponds to the number of stations of the stator. A station of the stator is defined below.

The sectors can have at least approximately the shape of circle segments which together form a cross-section of the rotor with an approximately circular outer periphery. Alternatively, the sectors can have other shapes that can be combined to make up a rotor, such as honeycombs or tubes with circular cross-section or blocks or slices or other shapes, for example. The single sectors can be attached to each other to form the rotor.

The stator can comprise a plurality of stations each of which comprises one or more stator open areas which, in a certain rotational position of the rotor, make up a part of one or more valves for supplying one single sector. By the rotational speed and the number of sectors, the cycle time for processing at one station can be set.

It is possible that at one station, two valves with different functions can be open simultaneously. For example, a process gas can be supplied to a sector, and at the same time, a cooling process can take place, each process being enabled by opening of at least one dedicated valve.

One can further think of a subsequent station in which the same functions of valves are deployed in order to prolong the processing time of a certain process.

Also, a sequence of stations can be provided which are arranged for a bidirectional flow of process gas through a sector.

In a further aspect of the invention, a method of gas separation is proposed in which the gas separation unit as described above is used for gas separation.

A possible use of the gas separation unit is the separation of carbon dioxide from a process gas. The process gas can for example originate from a chemical process, for example a combustion or another chemical reaction producing carbon dioxide. Carbon dioxide from the gas separation unit can be used in a sodium bicarbonate production process.

Figure 1B:
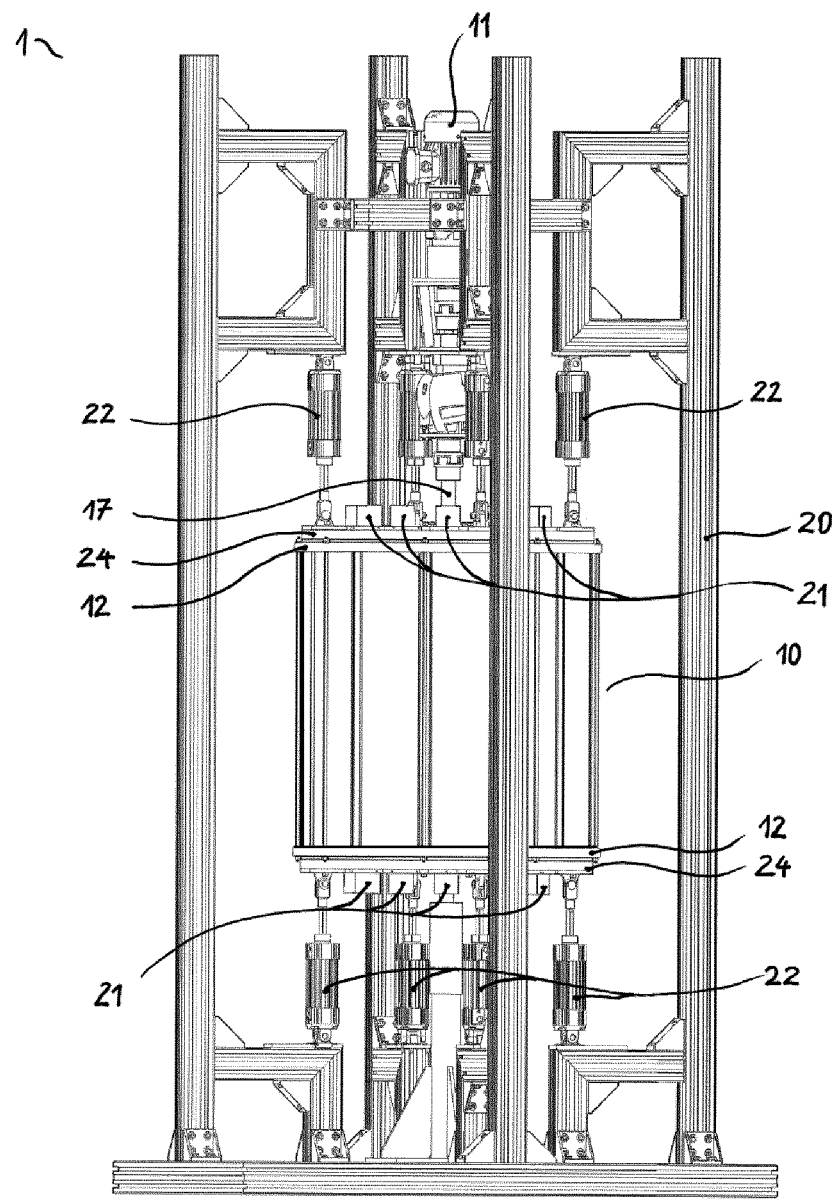
Figure 2A:
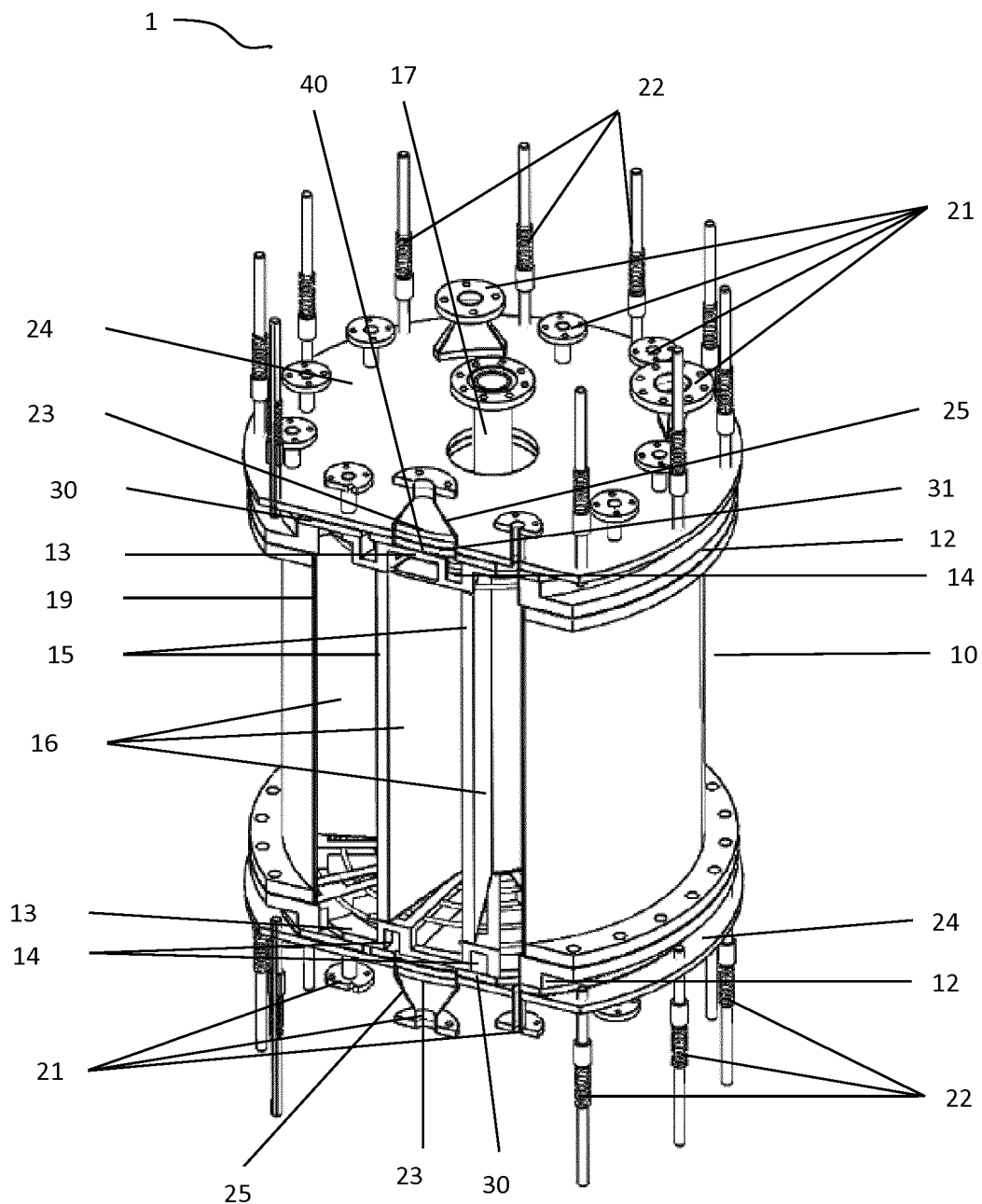
Figure 2B:
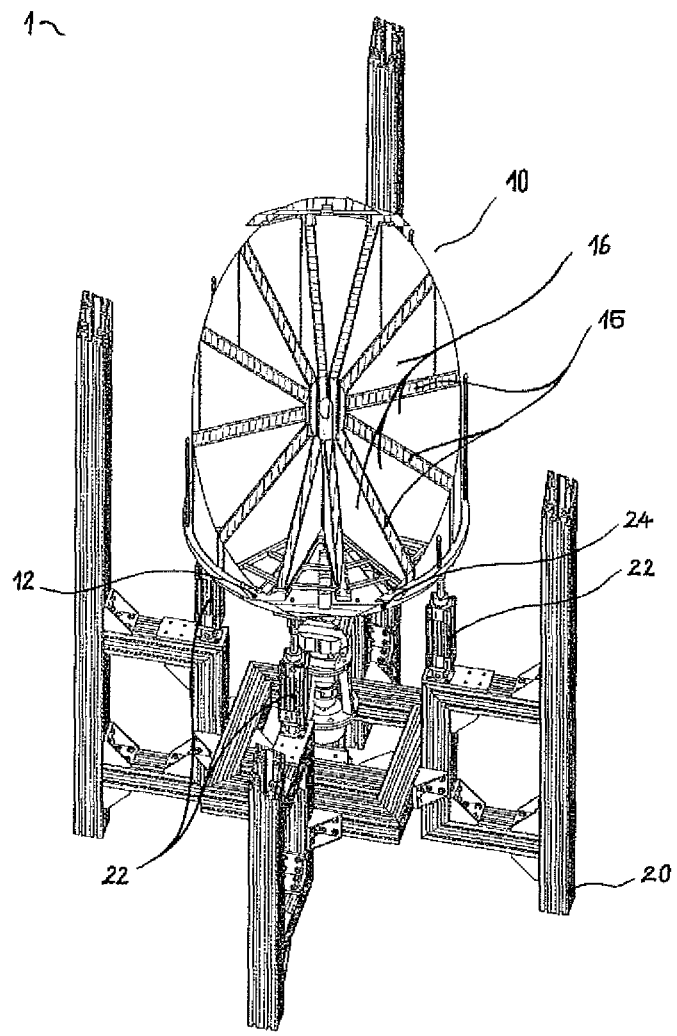
Figure 2C:
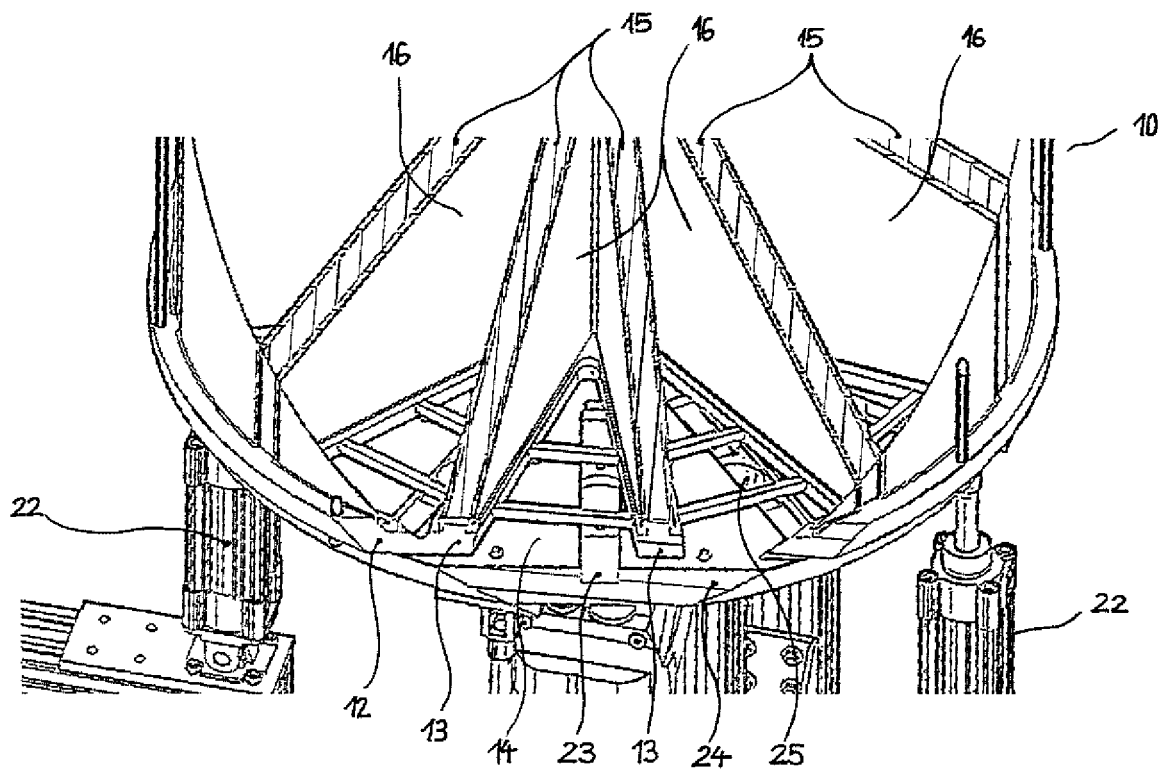
Figure 3:
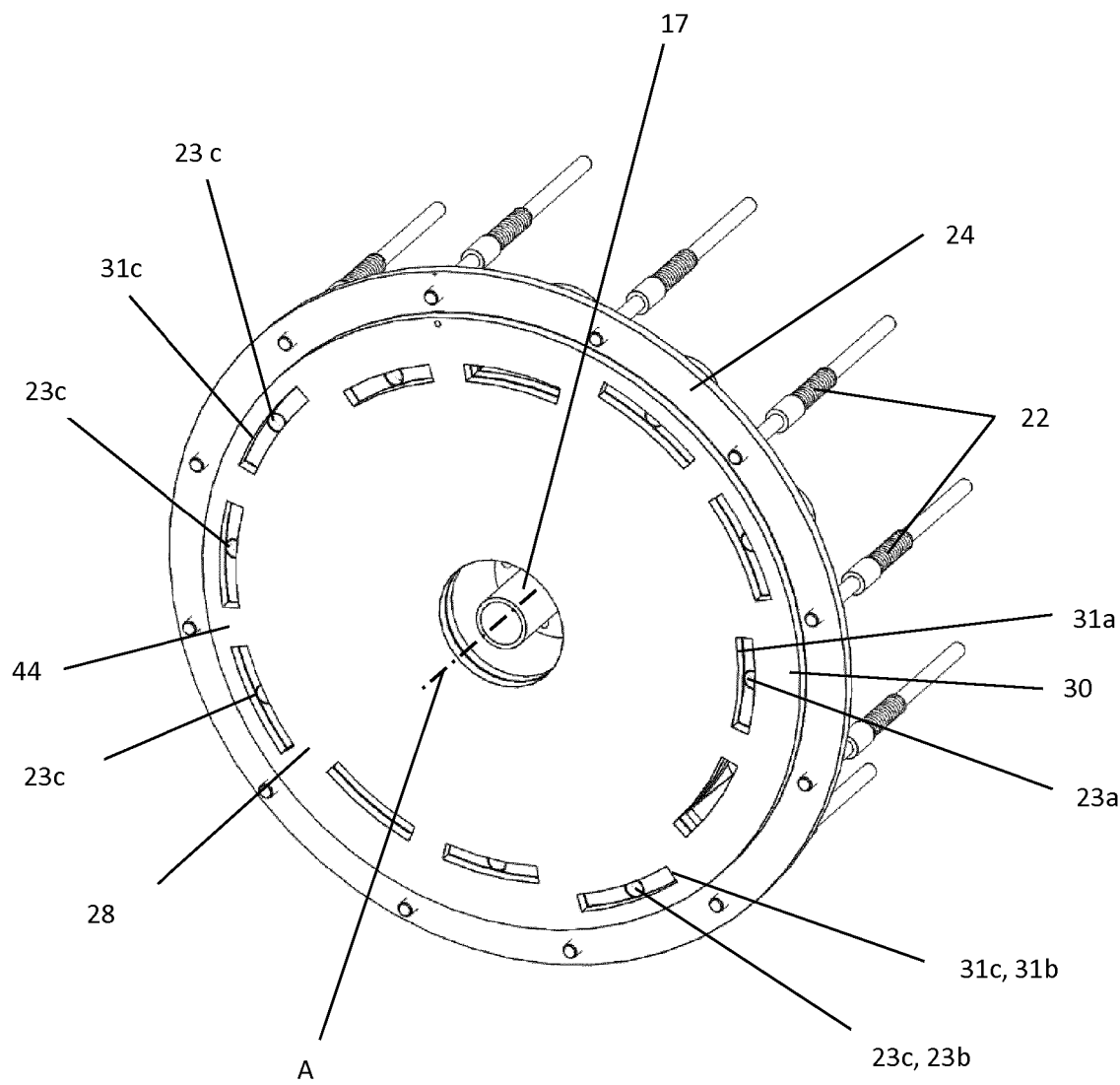
Figure 4A:
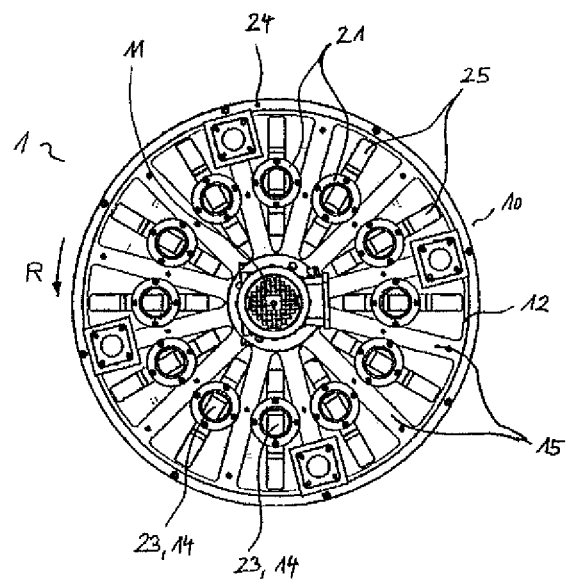
Figure 4B:
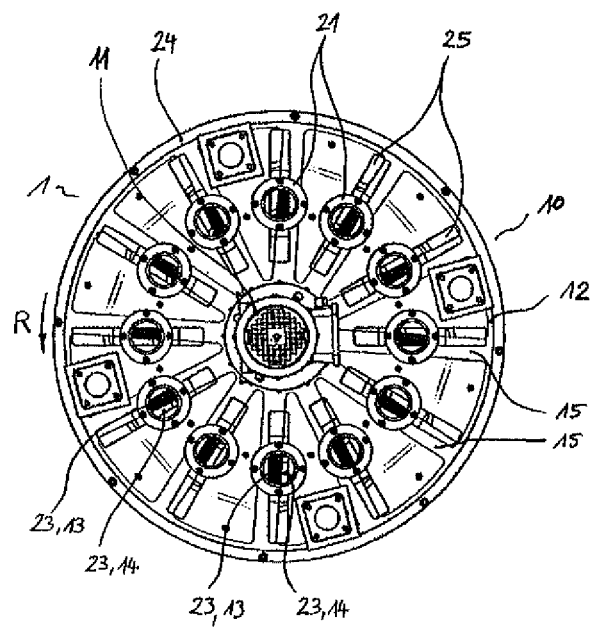
Figure 4C:
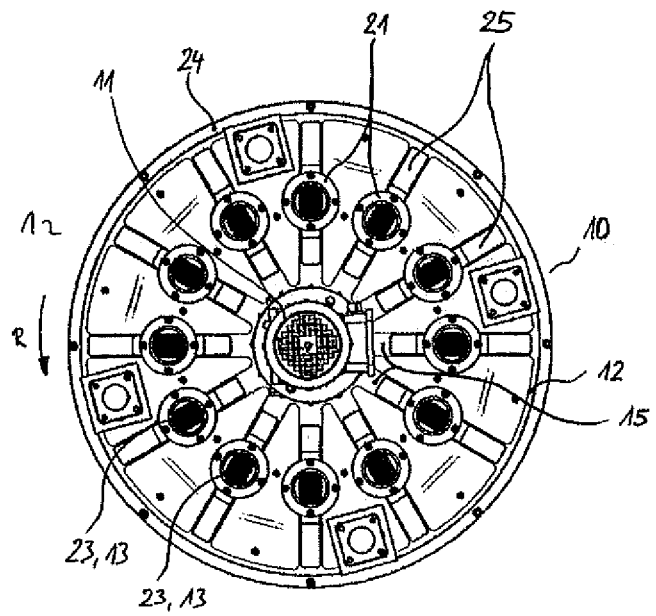
Figure 4D:
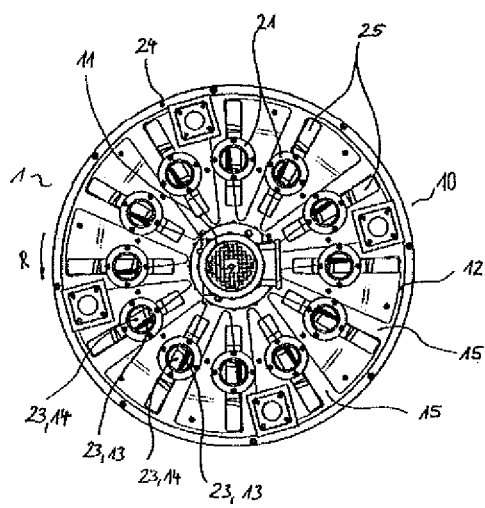
Figure 5:
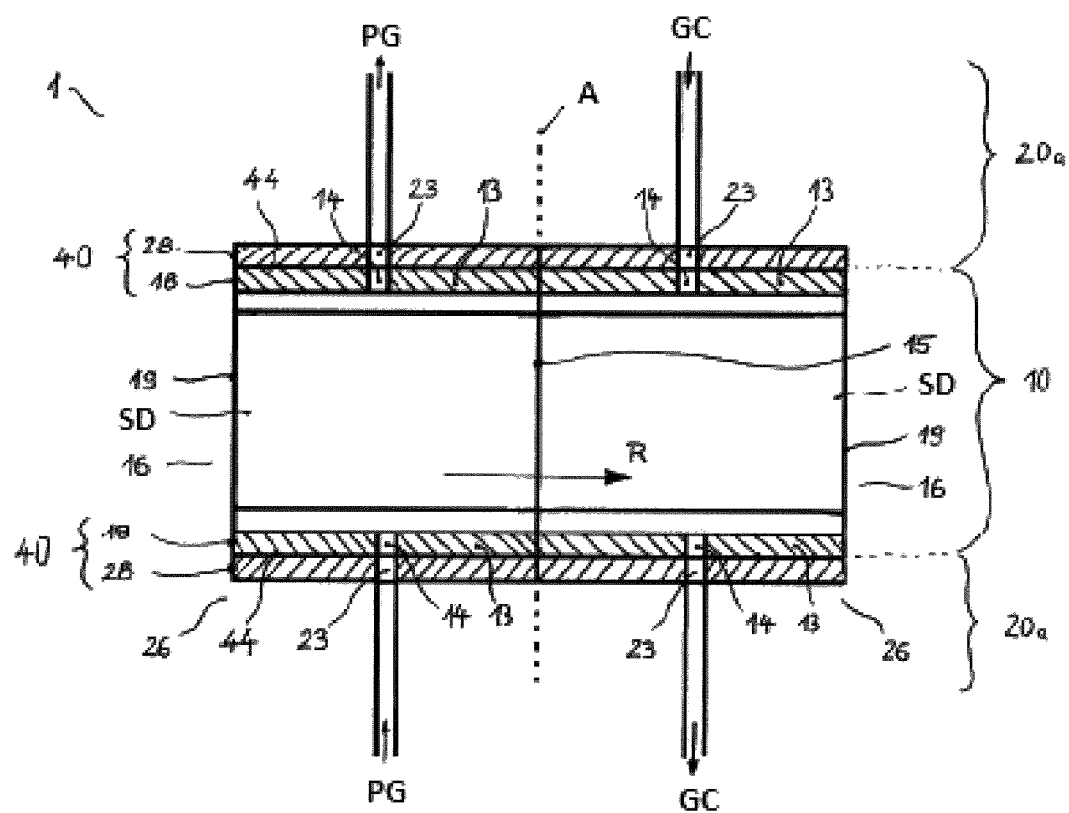

In the following, embodiments of the invention are described, as examples only, with regard to the attached figures. In the figures are:

FIG. 1a a schematic perspective view of a gas separation unit as a whole in a first embodiment, FIG. 1b a schematic front view of a gas separation unit as a whole in a second embodiment, FIG. 2a a schematic perspective view of the first embodiment of the gas separation unit in the first embodiment which is cut open, FIG. 2b a schematic perspective view of the gas separation unit in the second embodiment which is obliquely cut open, FIG. 2c a magnified part of FIG. 2b showing the valve at the bottom side of the rotor FIG. 3 a schematic perspective view of a sealing and a disc shaped stator valve region of the first embodiment, FIG. 4a a schematic top view of the gas separation unit in a second embodiment with the rotor in a first relative position to the stator, FIG. 4b a schematic top view of the gas separation unit in the second embodiment with the rotor in a second relative position to the stator, FIG. 4c a schematic top view of the gas separation unit in the second embodiment with the rotor in a third relative position to the stator, FIG. 4d a schematic top view of the gas separation unit in the second embodiment with the rotor in a fourth relative position to the stator, and FIG. 5 a schematic cross-section through a first embodiment of the gas separation unit.

Figure 6:
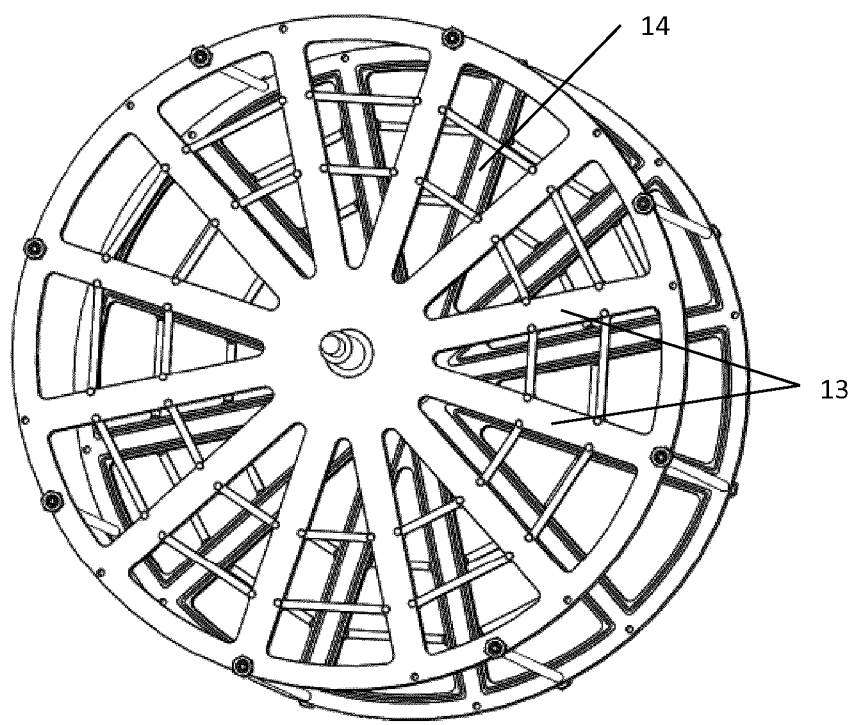

FIG. 6 a schematic perspective view through a second embodiment of the rotor.

Figure 7:
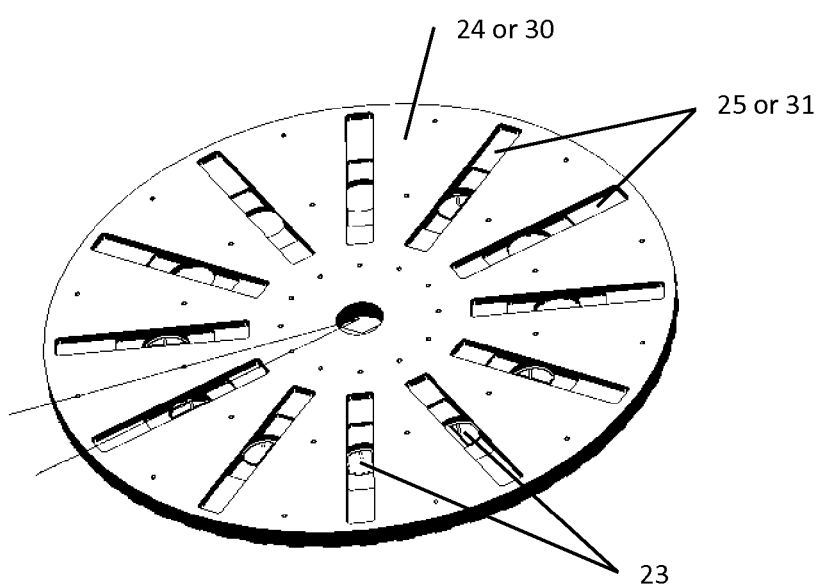

FIG. 7 a schematic perspective view through a second embodiment of the outside of the stator disc.

Figure 8:
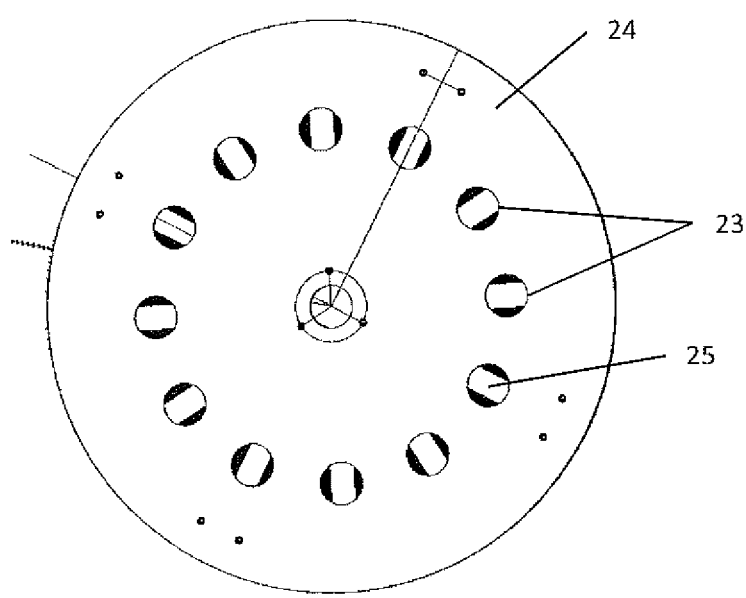

FIG. 8 a schematic top view through a second embodiment of the stator open area.

FIG. 1a is a schematic perspective view from obliquely above to a gas separation unit 1 in a first embodiment according to the invention. For size comparison, a person 2 is displayed beside the gas separation unit 1. In comparison to this example, the size of the gas separation unit 1 can be much larger as well. The gas separation unit 1 comprises a rotor 10 and a stator 20. The rotor 10 is rotatable relatively to the stator 20 about a shaft 17 which can be achieved by a drive 11. In the center of the shaft 17, a theoretical rotational axis located which is not shown in FIG. 1a. The stator 20 comprises two stator discs 24 which are arranged at each axial end of the rotor 10. The stator discs 24 are pressed against the axial ends of the rotor 10 by spring loaded pressing devices 22. In this way, the stator discs 24 are in pre-loaded touch with rotor discs 12 which are located at the axial ends of the rotor 10. The stator discs 24 each comprise several flanges 21 for supplying and discharging gas to and from the rotor 10, respectively. Each flange 21 is provided for supplying and discharging one sector, respectively, which is located inside the rotor 10 and which is not visible in FIG. 1a.

FIG. 1b is a front view of a second embodiment. The second embodiment is constructed similar to the first embodiment. Same features and elements are associated with the same reference numerals as in FIG. 1b and as in its description to which can be referred in this respect. Differences that are visible in FIG. 1b mainly concern the construction of the stator 20 which still has the same functions and the same main configuration.

FIG. 2a is a schematic perspective view of the first embodiment of the gas separation unit 1 which has been cut open partially for demonstration purposes. Same features and elements are associated with the same reference numerals as in FIGS. 1a and 1b and as in its description to which can be referred in this respect. Inside the rotor 10, sectors 17 are arranged which are bordered by an outer wall 19 of the rotor 10 and separated from each other by sector division walls 15. The sectors 16 approximately have a cross section of a circle segment with a cut tip. In these sectors 16, one or more gas separation devices are arranged which are not shown in FIG. 2a. Each of the sectors 16 can be supplied by a valve 40 and can be discharged by a valve 40. One single valve 40 can be used for supply and for discharge of a sector 16 at different times of operation, at which flow direction is reversed, respectively.

In this embodiment, the gas separation unit 1 comprises one valve 40 at each axial end of the rotor 10, for each sector 16. To each valve 40, in every rotational position of the rotor 10, one rotor solid area 13, one rotor open area 14 and one stator open area 23 is assigned. Rotor solid areas 13 and rotor open areas 14 rotate with the rotor 10, such that different rotor solid areas 13 and rotor open areas 14 can be assigned to the stationary stator open area 23. The stator open areas 23 are arranged in the stator discs 24. Each stator open area 23 is associated with one flange 21. The connection between the stator open area 23 and the flange 21 can be a diffusor 25, particularly for stator open areas 23 which have an enhanced width in rotational direction. The valves 40 can be open, closed and partially open which is determined by the portions of overlap of the stator open areas 23 with the rotor solid areas 13 and the rotor open areas 14, respectively. The rotor solid areas of 13 and the rotor open areas 14 are neighboring. The bigger the portion of the rotor open area 14 is, the more the valve 40 is opened. When rotation of the rotor 10, starting from a completely closed valve, effects an increasing overlap of the stator open area 23 and the rotor open area 14, the valve 40 continuously opens more until complete overlap is achieved. The stator open areas 23 have a greater dimension in rotational direction than the rotor open areas 14 have. In this way, full overlap of the rotor open areas 14 with the stator open areas 23 can occur over a certain rotational angle. When this overlap lessens again, a greater part of the rotor solid area 13 overlaps the stator of an area 23. Thus, valve is continuously closed more with the rotation of the rotor 10. The rotor solid area 13 has a width in rotational direction which is greater than the width in rotational direction of the stator of open area 23 such that the valve 40 can be completely closed by a complete overlap of these areas 13 and 23. In the closed state of the valve 40, the stator open area 23 is, by further rotation of the rotor 10, assigned to another sector 16 which comprises another rotor solid area 13 and another rotor open area 14. To this end, the sector division walls 15 are located in transition areas between the rotor solid areas 13 and their neighboring rotor open areas 14 of a neighboring sector 16.

The surfaces of the rotor solid areas 13, in rotational direction of the rotor 10, together form a flat ring shaped rotor valve region 18 which also defined to comprise the rotor open areas 14 though they are not from solid material. A surface of the stator disc 24 which in operation is directed to the rotor 10 comprises a flat ring shaped stator valve region 28 into which the stator open areas 23 are included. Between the rotor valve region 18 and the stator valve region 28, a sealing 30 is arranged. The sealing 30 is fixedly attached to the stator valve region 28 and has sealing openings 31 which have the same pattern and shapes of stator open areas 23. Therefore, the surface of the sealing 30 which is directed to the rotor 10 and which collaborates with the rotor valve region 18 is an active valve plane 44 in which opening and closing of the valve takes place. The sealing 30 can be detachable or can be a coating of the stator valve region 28.

FIGS. 2b and 2c are a schematic perspective view of the second embodiment of the gas separation unit 1 which is also shown in FIG. 1b and which has been cut open partially with an oblique cut for demonstration purposes. FIG. 2c shows a magnified part of FIG. 2b which comprises parts of a valve between the rotor 10 and the stator 10. Same features and elements are associated with the same reference numerals as in FIGS. 1a, 1b and 2a and as in its description to which can be referred in this respect. The second embodiment that is shown in FIGS. 2b and 2c differs from the first embodiment shown in FIG. 2a in that the rotor solid areas 13 are end parts of the separator walls 15. Here, a sealing or a rotor component of a sealing can be located which is not shown in FIGS. 2b and 2c. The space between the end parts of the separator walls 15 act as the rotor open area 14 at which gas can flow from or to a sector 16. The rotor solid areas 13 can overlap with stator open areas 23 which are located in the stator disc 24. Then, the valve is closed. The stator open areas 23 have a smaller width in rotational direction in comparison to their length and extend in radial direction in regard to a rotational axis of the rotor 10. The stator open areas 23 have substantially the same angular distance to their neighbors as the angular distance between the sector division walls 15. Therefore, transition of the rotor solid areas 13 from one sector of 16 to a neighboring sector 16 occurs simultaneously over all stator open areas 23. As the rotor solid areas 13 are wider in rotational direction as the width in rotational direction of the stator open area 23, in transition, no gas is transferred from one sector 16 to a neighboring sector 16. After a transition, the ends of the sector division walls 15 touch the surface of the stator disc 24 and seals one sector 16 from its neighbor sector 16. Then, the valve is open and gas can flow from the stator open areas 23 to the respective sectors 16. The stator open areas 23 are connected to diffusors 25, which are visible partially and from the inside only in FIG. 2c. From each diffusor, gas can flow from or to a sector 16 of gas separation unit 1. The rotor solid area 13, the rotor open area of 14 and the stator disk 24 with its stator open areas 23 form the valve at the lower axial end of the rotor 10. A second valve with the same construction and functions can be arranged at the upper end of the rotor 10.

FIG. 3 shows a schematic perspective view on the sealing 30 and the stator disc 24. The view is on the active valve plane 44 of the valves on top of the sealing 30 and on one side of the stator disc 24. The rotor is not shown in FIG. 3. Same features and elements are associated with the same reference numerals as in FIGS. 1a and 2a, 2b, 2c and their descriptions which can be referred to in this respect.

FIG. 3 shows stator open areas 23a and 23b which are located on different radii in regard of the rotational axis A which is located in the center of the shaft 17. In this way, for the different stator open areas 23a and 23b, different rotor solid areas and rotor open areas can be provided on respective radii. It is also possible, to omit the rotor solid areas on one radius such that stator open areas 23a or 23b on this radius can act as a continuous gas inlet or outlet towards and from the sectors, respectively. This can be advantageous for heating or cooling the sectors which can take place continuously. It is possible to lead gas from stator open areas 23a and 23b on different radii to different parts of the sectors. Then, gas that is delivered to a sector from different radii by stator open areas 23a and 23b does not mix in the sector. In this way, the process gas and separated gas can be led separated from heating or cooling gas.

Some of the stator open areas 23c have a smaller cross section than the associated sealing openings 31c. In this way, the sealing openings 31c can act as a diffusor. This solution is very cost-effective.

In FIG. 4a, a schematic top view of a second embodiment of the gas separation unit 1 is shown. The second embodiment is identical to the first embodiment in many respects such that only the differences will be described in the following. Same features and elements are associated with the same reference numerals as in FIGS. 1a, 1b, 2a, 2b, 2c and 3 and their descriptions which can be referred to in this respect.

The main difference between the first and the second embodiment is that in the second embodiment, the axial end surfaces of the sector dividing walls 15 are used as the rotor solid areas 13 which can close the stator open areas 23. The sector dividing walls 15 are displayed schematically by a star like element extending from the middle of the rotor. The sector dividing walls 15 are drafted with solid lines, although they in reality are located behind the stator disc 24. Another difference between the first and the second embodiment is that for supplying each stator open area 23, diffusors 25 are arranged in radial direction and on the outside of the stator disc 24. The stator open areas 23 have the same rectangular shape and therefore also mainly extend in a radial direction of the rotor 10. Each of the diffusors 25 is connected to one flange 21. The width of the sector dividing walls 15 in rotational direction is greater than the width of the diffusors 25 such that the valves can be closed completely. The areas of the sector dividing walls 15 which do not overlap with the stator open areas 23 run over a sealing between the stator and the rotor, which is not shown in FIG. 4a. In FIG. 4a, the valves are shown in a fully opened state in which the sector dividing walls 15 do not overlap with the diffusors 25 and the stator open areas 23, respectively.

In FIG. 4b, a schematic top view of a second embodiment of the gas separation unit 1 is shown. FIG. 4b is almost identical to FIG. 4a. In the following, only the differences to FIG. 4a are discussed. Same features and elements are associated with the same reference numerals as in FIG. 1a, 1b, 2a, 2b, 2c, 3 and 4a and their descriptions which can be referred to in this respect.

In contrast to FIG. 4a, the valves are shown partially closed in FIG. 4b. The stator open areas 23, the rotor open areas 14 and the rotor solid areas 13, partially overlap. The rotor solid areas 13 are shown in black. The rotor 10 and with it the sector dividing walls 15 are turning counter-clockwise as is shown by the arrow R. Therefore, the valves continue to close from the state that is shown in FIG. 4b.

In FIG. 4c, a schematic top view of a second embodiment of the gas separation unit 1 is shown. FIG. 4c is almost identical to FIGS. 4a and 4b. In the following, only the differences to FIG. 4b are discussed. Same features and elements are associated with the same reference numerals as in FIG. 1a, 1b, 2a, 2b, 2c, 3, 4a and 4b and its descriptions which can be referred to in this respect.

In FIG. 4c, the valves are shown in a completely close state. The sector dividing walls 15 are aligned with the diffusors 25 such that full cross-sections of the stator open areas 23 are overlapped by the sector dividing walls 15. The axial end surfaces of the sector dividing walls 15 which form rotor solid areas 13 are shown in black inside the stator open areas 23. From the closed state of the valves as shown in FIG. 4, the valves start opening again as the rotor 10 rotates further in direction R.

In FIG. 4d, a schematic top view of a second embodiment of the gas separation unit 1 is shown. FIG. 4d is almost identical to FIGS. 4a, 4b and 4c. In the following, only the differences to FIG. 4c are discussed. Same features and elements are associated with the same reference numerals as in FIG. 1a, 1b, 2a, 2b, 2c, 3, 4a, 4b and 4c and its description which can be referred to in this respect.

FIG. 4d shows the valves in a partially opened state similar to the state that is shown in FIG. 4b but with the difference that in FIG. 4d, the valves are still in the opening process. Only a small part of the cross-section of the stator open areas 23 is overlapped by the sector dividing walls 15. The gas separation unit 1 undergoes the following cycles:
1. valve fully open,
2. valve partially open and about to close,
3. valve completely closed, and
4. valve partially open and about to open.

In the second embodiment, the period of time in which the valves are fully open is the longest one amongst the cycles. One advantage is that this longest period of time contributes to an enhancement of the efficiency of the device. The period of time in which the valve is completely closed is the shortest of the cycles. Generally, the period of time in which the valves are completely closed does not exceed 30% of the period of time required for a complete cycle. Preferably it does not exceed 20%, more preferably it does not exceed 15%, even more preferably it does not exceed 10%.

FIG. 5 shows a schematic cross-section through a gas separation unit 1 according to the first embodiment of the invention, wherein the cross-section takes course through the rotational axis A. FIG. 5 is to explain components groups and the arrangement of components of a gas separation unit 1. For the same details, the same reference numerals as in the preceding Figures are used.

The gas separation unit 1 comprises two stator sections 20a between which a rotor 10 is arranged. The rotor 10 can be rotated about the rotational axis A in a rotational direction R. The rotor 10 comprises a plurality of sectors 16 wherein two sectors 16 are shown in FIG. 5. Each sector 16 comprises a separation device SD. Sector division walls 15 subdivide rotor 10 into the sectors 16. The sectors 16 are also limited by an outer wall 19 of the rotor 10. Each sector 16 comprises at each of its axial ends a flat rotor valve region 18, which each comprises one rotor open area of 14 for each sector 16. The rotor valve regions 18 each comprise rotor solid areas 13 which are located between the rotor open areas 14 which also are part of the rotor valve regions 18. The rotor valve regions 18 can be located on a rotor disc 12 as shown in FIGS. 1 and 2.

The stator sections 20a of the stator each comprise a flat stator valve region 28. The stator valve regions 28 can be located on a stator disc 24 as shown in FIGS. 1 to 3. The stator valve regions 28 each comprise one stator open area 23 for each sector 16. A station 26 is defined by one or both stator open areas 23 in one or both stator sections 20a which can be connected with one single sector 16 at the same time by a valve 40. At different stations 26, different gases, for example process gas PG and a gas component GC which is to be separated, can be supplied to or discharged from the sectors 16 which are located at the stations 26.

One stator valve region 28 and one rotor valve region 18 together form a set of valves 40. The number of valves 40 is the same as the number of sectors 16. The valve function is by overlapping the rotor open area 14 and the stator open area 23 which can be effected by rotating the rotor 10. Overlapping the stator open area 23 with a rotor solid area 13 closes the valve. The relative movement between the stator sections 20a and the rotor 10 takes place between the stator valve region 28 and the rotor valve region 18 of each set of valves 40. The rotor open area 14 can be much wider as shown in FIG. 5 such that only at the sector division walls 15, the rotor solid areas 13 are present. This corresponds to the second embodiment.

FIG. 6 shows a schematic perspective view through a second embodiment of the rotor 10. Same features and elements are associated with the same reference numerals as in FIGS. 2b, 2c, 4a, 4b, 4c, 4d and their descriptions which can be referred to in this respect. In FIG. 6 the rotor solid areas 13 are formed by axial end surfaces of sector boundary walls 15 i.e. walls separating the sectors 16. The space between the end parts of the sector boundary wall 15 act as the rotor open area 14 at which gas can flow from or to a sector 16.

FIG. 7 shows a schematic perspective view through a second embodiment of the outside of the stator disc 24, which is in contact with the rotor in the gas separation unit 1. Same features and elements are associated with the same reference numerals as in FIGS. 3, 4a, 4b, 4c, 4d and their descriptions which can be referred to in this respect. Said outside of the stator disc comprises diffusors 25 arranged in radial direction and having a rectangular shape. In some preferred embodiments sealings 30 are arranged between the rotor 10 and the stator discs 24, wherein the sealings comprise sealing openings 31 arranged in radial direction and are fixed to the stator disc 24 and wherein the patterns of the sealing openings match with the patterns of the diffusors 25 comprised in the stator discs 24. In some other preferred embodiments, the outside of the stator discs do not comprise diffusors 25 and sealings 30 are arranged between the rotor 10 and the stator discs 24, wherein the sealings 30 comprise sealing openings 31 arranged in radial direction and are fixed to the stator discs 24 and wherein the sealing openings 31 constitute the set of diffusors 25 as represented on FIG. 7. The stator disc of FIG. 7 is preferably combined with the rotor of FIG. 6. The width in rotational direction of the rotor solid areas 13 of FIG. 6 is greater than the width of the diffusors 25 of the stator of FIG. 7 such that the valves can be closed completely. The use of the stator disc (or sealing) of FIG. 7 in association with the rotor of FIG. 6 has the advantageous effect that the dead zone which contributes to dilution of the gas to be separated is reduced as the location of valve action is arranged at the outer surface of the rotor. This is because the open areas of the valve are arranged to the closest of the separation device. Accordingly, in a preferred embodiment of the invention, the separation unit is free of any conduit connecting the valve to the sector useful as gas inlet or outlet towards and from the separation device, respectively; it results therefrom that no residual process gas can remain entrapped in such a conduit. Moreover, the volume of the stator disc (or sealing) diffusor is not a part of the dead zone. The stator open areas 23 which allow gas flow from or to the rotor can be seen from the inside of the rectangular shaped diffusors 25.

FIG. 8 shows a schematic top view through a second embodiment of the stator open areas 23 of the stator disc 24. Same features and elements are associated with the same reference numerals as in FIGS. 3, 4a, 4b, 4c, 4d and their descriptions which can be referred to in this respect. In FIG. 8 are represented in foreground the stator open areas 23 which allow gas flow from or to the rotor. Said stator open areas 23 are connected, to the diffusors 25 having a rectangular shape and arranged in radial direction, on one side and to flanges 21 on the other side for supplying and discharging gas to and from the rotor. The rectangular shape of the diffusors 25 can be seen from the inside of the stator open areas 23 on FIG. 8.

The invention claimed is:

1. A gas separation unit (1) for separation of a gas component (GC) from a process gas (PG) stream,
    wherein the separation unit (1) comprises a stator (20) and a rotor (10) which is connected to the stator (20) and is rotatable relatively to the stator (20) about a rotational axis (A),
    the rotor (10) comprising a plurality of sectors (16),
    each sector (16) containing a separation device (SD) arranged to separate the gas component (GC) from the process gas (PG) stream which is led into the separation device (SD),
    wherein each sector (16) is fluidically connected with at least one valve (40),
    wherein the valve (40) is a rotary active valve (40), the rotary active valve (40) comprising a stator open area (23) which is located in a stator valve region (28) of the stator (20),
    wherein the rotor (10) comprises a rotor valve region (18) having a
    rotor solid area (13) which is overlappable with the stator open area (23) in order to close the valve (40), and a rotor open area (14) which is overlappable with the stator open area (23) in order to open the valve (40),
    wherein an extent of overlapping of the stator open area (23), the rotor solid area (13) and the rotor open area (14) is changeable by a rotation (R) of the rotor (10) relative to the stator (20);
    wherein the stator (20) comprises two stator discs (24) which are arranged at each axial end of the rotor (10), and wherein diffusors (25) are arranged in radial direction and on the outside of the stator discs (24).

2. The gas separation unit (1) according to claim 1, wherein the rotor solid area (13) is formed by an axial end surface of a sector boundary wall (15).

3. The gas separation unit (1) according to claim 2, wherein the space between the end parts of the sector boundary wall (15) act as the rotor open area (14) at which gas can flow from or to the sector (16).

4. The gas separation unit (1) according to claim 1, wherein the rotor solid area (13) is combined with a flat plate or disc formed stator valve region (28).

5. The gas separation unit (1) according to claim 1, wherein the width of the rotor solid area (13) is greater than the width of the diffusors (25), in rotational direction such that the valves (40) can be closed completely.

6. The gas separation unit (1) according to claim 1, wherein a sealing (30) is arranged between the valve region of the rotor (18) and the valve region of the stator (28).

7. The gas separation unit (1) according to claim 6, wherein the sealing (30) has sealing openings (31) and the stator open areas (23) are stator open areas (23c) which have a smaller cross section than the associated sealing openings (31c), so that the sealing openings (31c) can act as diffusors (25).

8. The gas separation unit (1) according to claim 6, wherein the sealing (30) comprises sealing openings (31) and is fixed to one of the stator (20) and the rotor (10), wherein the pattern of the sealing openings matches with the pattern of the stator open areas (23) when the sealing is fixed to the stator (20), or the pattern of the sealing openings matches with the pattern of the rotor open areas (14) when the sealing is fixed to the rotor (10), wherein the sealing is preferably fixed to the stator (20).

9. The gas separation unit (1) according to claim 8, wherein the sealing (30) comprises two sealing components, whereof one is arranged at the rotor (10) and the other one is arranged at the stator (20).

10. The gas separation unit (1) according to claim 9, wherein one of the sealing components is made of a softer material than the other one.

11. The gas separation unit (1) according to claim 1, wherein sealings (30) are arranged between the rotor (10) and the stator discs (24), wherein the sealings comprise sealing openings (31) arranged in radial direction and are fixed to the stator discs (24) and wherein the patterns of the sealing openings (31) match with the patterns of the diffusors (25) comprised in the stator discs (24).

12. The gas separation unit (1) according to claim 1, wherein sealings (30) are arranged between the rotor (10) and the stator discs (24), wherein the sealings comprise sealing openings (31) arranged in radial direction and are fixed to the stator discs (24) and wherein the sealing openings (31) constitute the set of diffusors (25).

13. The gas separation unit (1) according to claim 1, wherein it is free of any conduit connecting the valve (40) to the sector (16) useful as gas inlet or outlet towards and from the separation device (SD), respectively.

14. The gas separation unit (1) according to claim 1, wherein each sector (16) is such that its dead zone, if any, does not exceed 5 vol. %, of the total volume of the sector (16).

15. The gas separation unit (1) according to claim 1, wherein each sector (16) is such that its dead zone, if any, does not exceed 5 vol. % of the total volume of the gas separation device (SD).

16. The gas separation unit (1) according to claim 1, wherein the rotor open area (14) and the stator open area (23) both have a size which is small in comparison to a cross-section perpendicular to the rotational axis, and the rotor solid area (13) is an outer surface of the rotor (10).

17. The gas separation unit (1) according to claim 1, wherein each sector (16) has a heating and cooling system that is independent from the gas component (GC) stream and the process gas throughput that are led through the sector (16).

18. A method for separation of a gas component (GC) from a process gas (PG) stream, the method comprising using the gas separation unit (1) according to claim 1.

19. The gas separation unit (1) according to claim 15, wherein each sector (16) is essentially free or is even completely free of dead zone.

* * * * *